US009292528B2

(12) United States Patent
Hirose (10) Patent No.: US 9,292,528 B2
(45) Date of Patent: Mar. 22, 2016

(54) INFORMATION PROCESSING APPARATUS, METHOD, AND MEDIUM FOR PROCESSING FILES STORED IN A STORAGE MEDIUM (75) Inventor: Ayako Hirose, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 84 days.

(21) Appl. No.: 13/532,683

(22) Filed: Jun. 25, 2012

(65) Prior Publication Data

US 2013/0024482 A1 Jan. 24, 2013

(30) Foreign Application Priority Data

Jul. 22, 2011 (JP) .................................. 2011-161369

(51) Int. Cl.
G07F 7/00 (2006.01)
G06F 17/30 (2006.01)

(52) U.S. Cl.
CPC .............................. G06F 17/30141 (2013.01)

(58) Field of Classification Search
None
See application file for complete search history.

(56) References Cited

U.S. PATENT DOCUMENTS

| 8,369,689 | B2* | 2/2013 | Shimizu et al. ............... 386/262 |
| 2002/0052974 | A1* | 5/2002 | Saito ........................ H04L 69/04 709/247 |
| 2003/0157947 | A1* | 8/2003 | Fiatal et al. ................... 455/466 |
| 2005/0195435 | A1* | 9/2005 | Kojima ............... H04N 1/00347 358/1.16 |
| 2006/0123044 | A1* | 6/2006 | Minami ........................ 707/102 |
| 2006/0152582 | A1* | 7/2006 | Uchida ................ G02B 21/365 348/79 |
| 2008/0215598 | A1* | 9/2008 | Haga ...................... G06F 3/1205 |
| 2009/0161134 | A1* | 6/2009 | Suga |
| 2009/0244587 | A1* | 10/2009 | Tsukada ............ H04N 1/00347 358/1.13 |

FOREIGN PATENT DOCUMENTS

| JP | 2006-66944 | 3/2006 |
| JP | 2009122860 A * | 6/2009 |
| JP | 2010-49317 | 3/2010 |

OTHER PUBLICATIONS

Japanese Office Action issued on Feb. 2, 2015 during prosecution of related Japanese application No. 2011-161369.

* cited by examiner

*Primary Examiner* — Debbie Le
*Assistant Examiner* — Hasanul Mobin
(74) *Attorney, Agent, or Firm* — Fitzpatrick, Cella, Harper & Scinto (57) ABSTRACT

An information processing apparatus acquires pieces of file information for specifying each of a plurality of files as candidates for which predetermined processing is executed. The apparatus generates a file list for specifying one or more first files as some of the plurality of files, on a memory, based on the pieces of acquired file information. The apparatus newly generates, in a case where the predetermined processing is executed for one or more second files of the plurality of files, a file list corresponding to the one or more second files on an area of the memory in which the file list corresponding to the one or more first files is stored.

20 Claims, 4 Drawing Sheets

INFORMATION PROCESSING APPARATUS, METHOD, AND MEDIUM FOR PROCESSING FILES STORED IN A STORAGE MEDIUM

BACKGROUND OF THE INVENTION

1. Field of the Invention

The present invention relates to an information processing apparatus for processing files stored in a storage medium, an information processing method, and a storage medium for storing a program.

2. Description of the Related Art

A function of displaying images based on files stored in a storage medium and printing the image in an apparatus connectable to a storage medium such as a memory card is known. Such apparatus acquires information of files stored in the storage medium to generate a file information list, and executes various kinds of processing such as file display and print processes based on the file information list.

As a method of generating such file information list, Japanese Patent Laid-Open No. 2009-122860 describes the following method. That is, a temporary file information list including information of all image files in the storage medium is generated and only image files that match conditions designated by the user are extracted from that list, thereby generating a file information list.

With the aforementioned related art, once the temporary file information list including information of all files in the storage medium is generated, the file information list of files according to user's designation is generated.

That is, in the aforementioned related art, since the file information list of all files in the storage medium is generated first, processing for files cannot be executed until generation of the file information list of all the files is complete.

SUMMARY OF THE INVENTION

An aspect of the present invention is to eliminate the above-mentioned problems from the conventional technology. The present invention provides an information processing apparatus which can appropriately generate a file list of files stored in a storage medium, an information processing method, and a storage medium storing a program.

The present invention in its first aspect provides an information processing apparatus comprising: an acquisition unit configured to acquire pieces of file information for specifying each of a plurality of files as candidates for which predetermined processing is executed; and a generation unit configured to generate a file list for specifying one or more first files as some of the plurality of files, on a memory, based on the pieces of file information acquired by the acquisition unit, and to newly generate, in a case where the predetermined processing is executed for one or more second files of the plurality of files, a file list corresponding to the one or more second files on an area of the memory in which the file list corresponding to the one or more first files is stored.

The present invention in its second aspect provides an information processing method comprising: acquiring pieces of file information for specifying each of a plurality of files as candidates for which predetermined processing is executed; and generating a file list for specifying one or more first files as some of the plurality of files, on a memory, based on the pieces of the acquired file information, and newly generating, in a case where the predetermined processing is executed for one or more second files of the plurality of files, a file list corresponding to the one or more second files on an area of the memory in which the file list corresponding to the one or more first files is stored.

The present invention in its third aspect provides a computer-readable storage medium storing a program for controlling a computer to execute to: acquire pieces of file information for specifying each of a plurality of files as candidates for which predetermined processing is executed; and generate a file list for specifying one or more first files as some of the plurality of files, on a memory, based on the pieces of the acquired file information, and newly generate, in a case where the predetermined processing is executed for one or more second files of the plurality of files, a file list corresponding to the one or more second files on an area of the memory in which the file list corresponding to the one or more first files is stored.

According to the present invention, a file list of files stored in a storage medium can be appropriately generated.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components throughout the drawings, and a description thereof will not be given.

Figure 1:
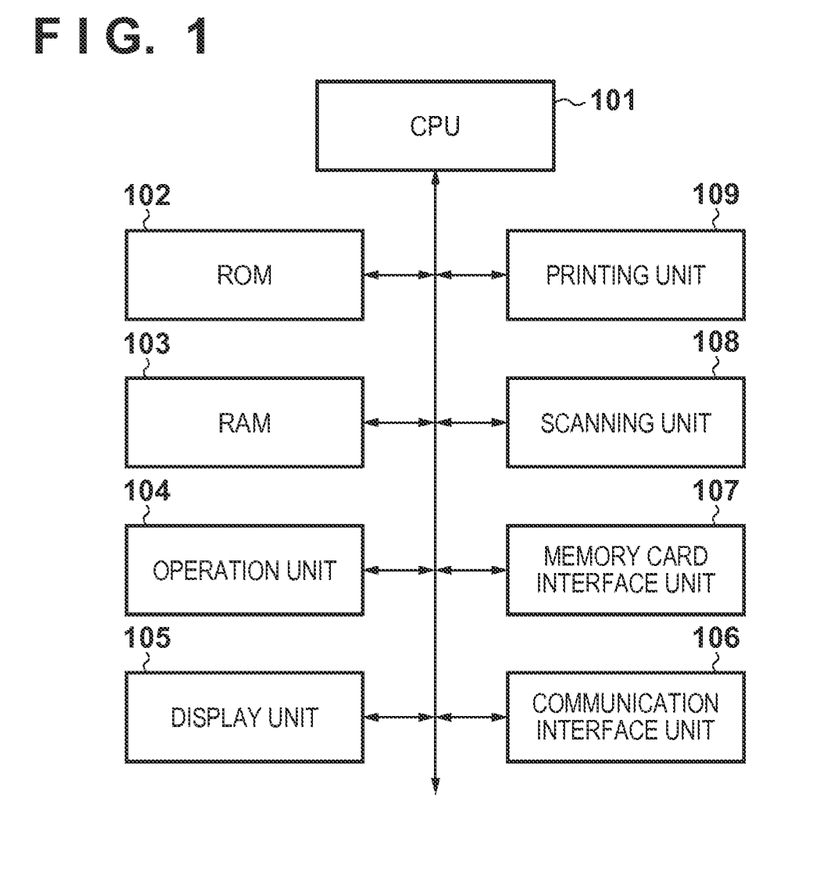
FIG. 1 is a block diagram showing an example of the arrangement of an information processing apparatus.

FIG. 1 is a block diagram showing the arrangement of an information processing apparatus according to this embodiment. In this embodiment, as an information processing apparatus, for example, a printing apparatus or MFP (Multifunctional Apparatus) is used. A CPU 101 shown in FIG. 1 controls the overall information processing apparatus. A ROM 102 stores programs and data, and a RAM 103 is a storage unit used as a temporary storage area (for example, an image memory) and the like. An operation unit 104 includes keys and the like, which are used by the user to make operations, and the information processing apparatus inputs user instructions via this operation unit 104.

A display unit 105 displays graphics, messages, and the like. A communication interface 106 is used to make communications with external apparatuses. A memory card interface 107 is that with an external storage medium such as a memory card. A scanning unit 108 scans an image of a document, and a printing unit 109 outputs image data onto a print medium such as a paper sheet.

Note that the image need not be displayed or printed by the display unit 105 or printing unit 109, but it may be displayed or printed by an external display device or printing device of the information processing apparatus, which device is connected to the communication interface 106.

In this embodiment, a file list of image files stored in the external storage medium connected to the memory card interface 107 is generated on the RAM 103. Then, an image of an image file specified as a processing target in that file list is output to and displayed by, for example, a display device. Or an image of an image file is output to and printed by a printing device.

In this embodiment, when the number of files stored in the storage medium is equal to or larger than a predetermined value, a file list corresponding to some of the files stored in the storage medium is generated. Then, a file list of other files stored in the storage medium is not generated, and that file list is generated after a user instruction is input. Details will be described later.

Figure 2:
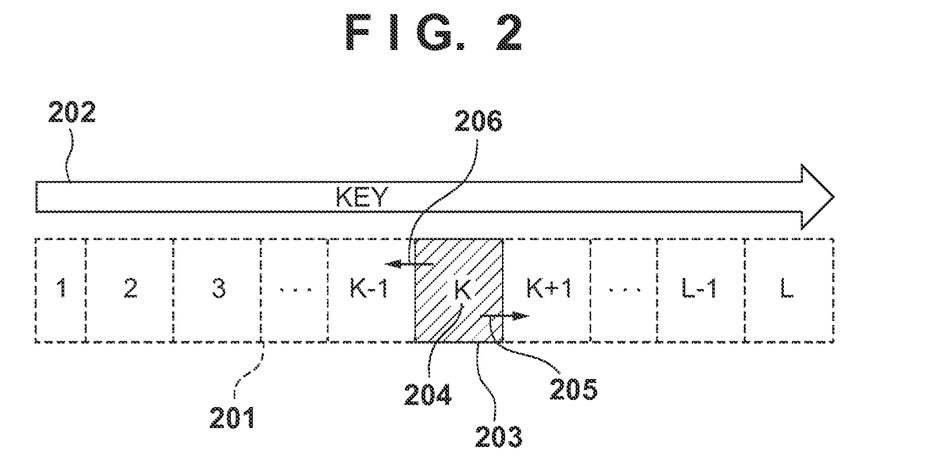
FIG. 2 is a view for explaining an outline of a file information list and group changing.

FIG. 2 is a view for explaining an outline of a file information list and group changing according to this embodiment. In this embodiment, the information processing apparatus classifies a plurality of image files stored in an external storage medium such as a memory card into groups. Then the information processing apparatus stores pieces of file information about image files for the respective groups in a memory that is represented by the RAM 103. File information in this case is, for example, a file name and file path information required to access that file. The information processing apparatus generates a file list based on the pieces of file information stored in the memory, and presents the generated file list to the user. As this presentation method, the information processing apparatus outputs the file list as an image. For example, the information processing apparatus prints the file list on a print medium such as a paper sheet or displays it on the display unit 105, thus outputting the file information list.

In this embodiment, a file list is generated for each group shown in FIG. 2. When a file list of a certain group is generated, and that file list is output, a file list generation instruction is waited for without generating any file list of another group. The user checks the file list of the certain group, which is output, as described above, and inputs an output instruction of a file list of another group via the operation unit 104. Then, upon reception of that instruction, the information processing apparatus stores pieces of file information of image files of another group other than the group, the file list of which has already been output, and outputs a file information list, as described above.

In this way, according to this embodiment, a file list is generated for each group of files. At this time, only a file list of a group as a processing target is generated, and a file list of another group which is not selected as a processing target is not generated.

In this manner, even when there are a large number of files as processing target candidates, a file list which corresponds to all these files and has a large data volume need not be generated. Therefore, processing for displaying or printing files as processing targets can be executed without waiting for generation of a file list corresponding to all the files.

In this embodiment, a file list of a group, which is not selected as a processing target, is generated when a user instruction is received. For this reason, files, which are not selected as processing targets, and a file list of which is not generated, can be appropriately specified as processing targets according to a user instruction, thus appropriately processing these files.

Furthermore, in this embodiment, after a file list of files as processing targets is generated, when these files are excluded from processing targets, the file list of these files is deleted from the memory of the information processing apparatus. For this reason, even when an area required to store a file list corresponding to all files as processing target candidates cannot be assured on the memory of the information processing apparatus, file lists of many files can be output to the user by effectively using the limited memory size.

A virtual file information list 201 shown in FIG. 2 represents a file list of all image files in the storage medium. The virtual file information list 201 is a file list used to virtually explain an outline of group changing of this embodiment, and such file list is not actually generated at once. The virtual file information list 201 is sorted using one or more keys which can order image files in the storage medium based on date and time information such as photographing dates and times and dates and times of generation of image files and attribute information such as file names. Keys include, for example, date and time information, and newer date and times are used as keys which assume larger values. An arrow 202 indicates a sorting order of keys; key values are decreasing toward the left, and they are increasing toward the right. Also, the keys may include, for example, file names. In this case, key values can be defined according to an arbitrary order such as an alphabetical order. Furthermore, the date and time information and file names may be combined to define key values.

A file information list 203 indicates a file information list of image files which belong to one group when all image files stored in the storage medium, that is, all the image files which belong to the virtual file information list are classified into groups each including predetermined N image files. In this case, "N" indicates an upper limit value of the number of image files registered in the file information list 203.

A group ID 204 is that appended to the file information list 203. A changing direction 205 indicates a direction to change to a next group corresponding to larger key values. A changing direction 206 indicates a direction to change to a previous group corresponding to smaller key values.

As shown in FIG. 2, the virtual file information list 201 is grouped into L groups, that is, groups 1 to L. The information processing apparatus of this embodiment generates a file information list 203 for group L corresponding to largest key values first, and sequentially changes groups in accordance with user instructions to generate new file information lists 203. Alternatively, the information processing apparatus may generate a file information list 203 for group 1 corresponding to smallest key values first.

When a group ID selected as a current generation target of a file information list is "K" shown in FIG. 2, and the user inputs a changing instruction to the previous group via the operation unit 104, this information processing apparatus generates a file information list 203 of a group ID "K−1". When a current group ID is "K" shown in FIG. 2, and the user inputs a changing instruction to the next group via the operation unit 104, this information processing apparatus generates a file information list 203 of a group ID "K+1".

Figure 3:
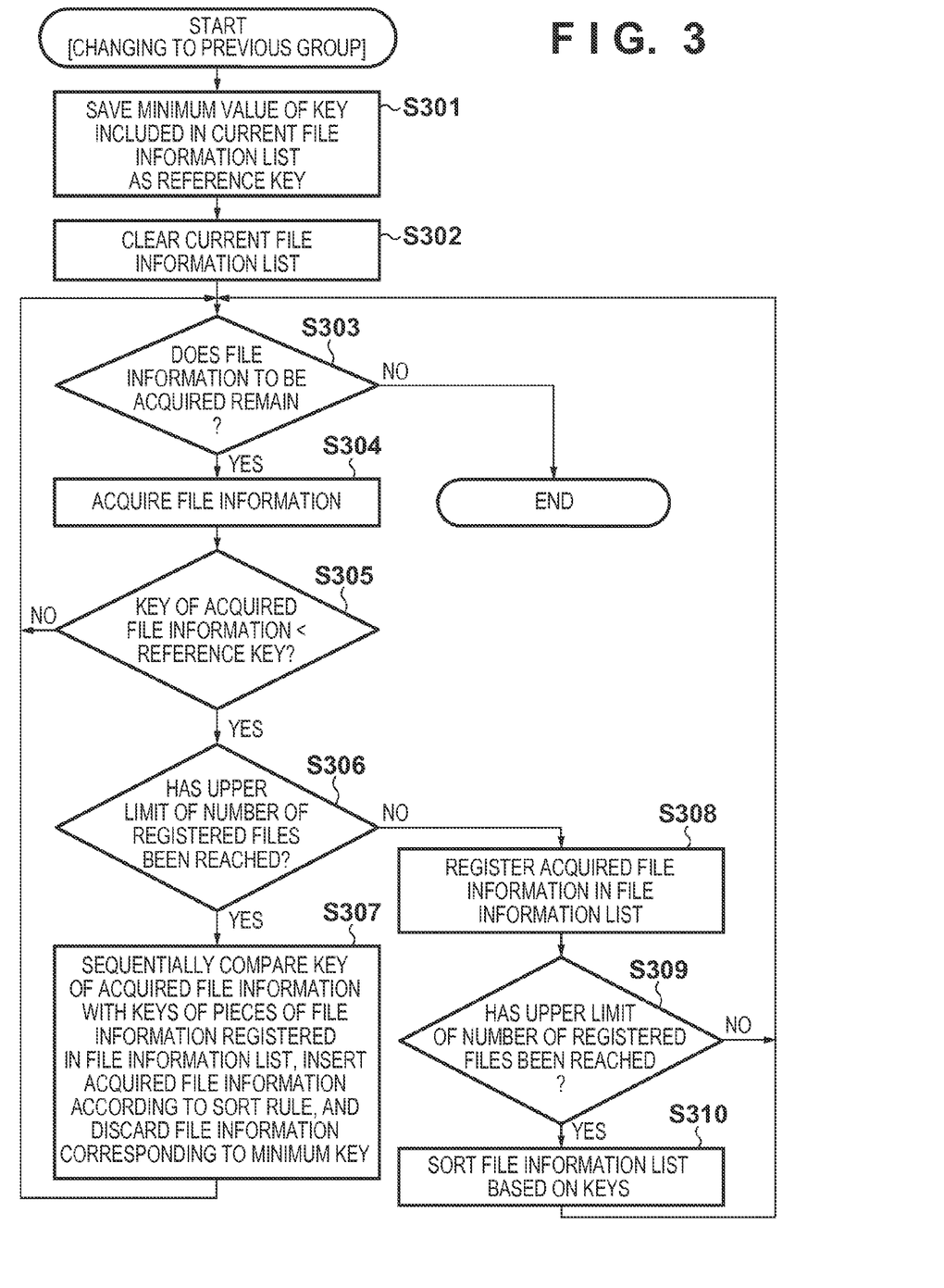
FIG. 3 is a flowchart showing the sequence of processing for changing a file information list to a previous group.

Processing for changing from group "K" to group "K−1" in accordance with the changing instruction to the previous group, which is input by the user via the operation unit 104, will be described below with reference to FIG. 3. The processing shown in FIG. 3 is implemented when the CPU 101 executes a program stored in the ROM 102 using the RAM 103 as a work memory.

The CPU 101 temporarily saves a minimum value of key values of a plurality of image files included in the current file information list 203 as a reference key (S301). A file corresponding to the minimum key value is that which corresponds to a key value closest to that of a file included in group "K−1" shown in FIG. 2.

Then, the CPU 101 clears the file information list 203 currently stored in the RAM 103 (S302). Assume that the RAM 103 stores the file information list corresponding to one group. For this reason, every time a group for which a file information list is generated is changed, the file information list currently stored in the RAM 103 is deleted, as in step S302. In case of the example shown in FIG. 3, the file information list corresponding to group "K" is deleted.

Next, the CPU 101 determines whether or not an image file whose file information is not acquired of those stored in the external storage medium remains (S303). If it is determined that no image file whose file information is not acquired remains, this processing ends. No image file whose file information is not acquired remains when determination as to whether or not all image files in the storage medium belong to group "K−1" is complete.

If it is determined in step S303 that an image file whose file information is not acquired remains, file information of that image file is acquired (S304). The CPU 101 determines whether or not a key value corresponding to the acquired file information is smaller than the reference key value temporarily saved in step S301 (S305). If it is determined that the key value corresponding to the acquired file information is not smaller than the reference key value, the process returns to step S303. In this way, if a key value of file information of an image file of interest is not smaller than the reference key value, since it is determined that the image file of interest belongs to any of groups "K" to "L" corresponding to key values larger than group "K−1", the process returns to step S303 to search for the next image file.

On the other hand, if it is determined that the key value corresponding to the acquired file information is smaller than the reference key value, the process advances to step S306. At this time, since the key value of the image file of interest is smaller than the reference key value, it is determined that the image file of interest belongs to any of groups "1" to "K−1".

Then, the CPU 101 determines whether or not the number of pieces of already acquired file information has reached the upper limit value N of the number of files registered per group (S306). If it is determined that the number of pieces of already acquired file information has reached the upper limit value N, a file list of the N files can already be generated. However, these N files belong to any of groups "1" to "K−1" but they do not always belong to group "K−1". Hence, processing for excluding a file which does not belong to group "K−1" of the N files from the file list is executed in step S307.

In step S307, the key value corresponding to the file information acquired in step S304 is sequentially compared with those corresponding to the N pieces of the already acquired file information. At this time, if the key value of the file information acquired in step S304 is smaller than those of the N pieces of file information, it is determined that a file of the file information acquired in step S304 does not belong to group "K−1". On the other hand, if the key value of the file information acquired in step S304 is larger than that of any of the N pieces of file information, it is determined that file information corresponding to a minimum key value of the N pieces of file information does not belong to group "K−1".

Hence, in step S307, as a result of the above comparison, of the file information acquired in step S304 and the N pieces of already acquired file information, file information corresponding to a minimum key value is excluded from the file list. Note that a file list including N pieces of file information is sorted according to key values of these pieces of file information in step S310 (to be described later). For this reason, in step S307, the file information acquired in step S304 is inserted into the file information list 203 according to that sort rule, and file information corresponding to a minimum key value as a result of insertion is deleted. Note that as a result of the above comparison, if the key value of the file information acquired in step S304 is minimum, that file information is inhibited from being inserted in the file list. After such processing in step S307, the process returns to step S303.

If it is determined in step S306 that the number of pieces of already acquired file information has not reached the upper limit value N yet, the CPU 101 newly registers the file information acquired in step S304 in the file information list 203 (S308). Then, the CPU 101 determines again whether or not the number of pieces of file information registered in the file information list 203 has reached the upper limit value N (S309). If it is determined that the number of pieces of registered file information has not reached the upper limit value N yet, the process returns to step S303. On the other hand, if it is determined that the number of pieces of registered file information has reached the upper limit value N, the file information list 203 is sorted based on key values (S310), and the process then returns to step S303.

Figure 4:
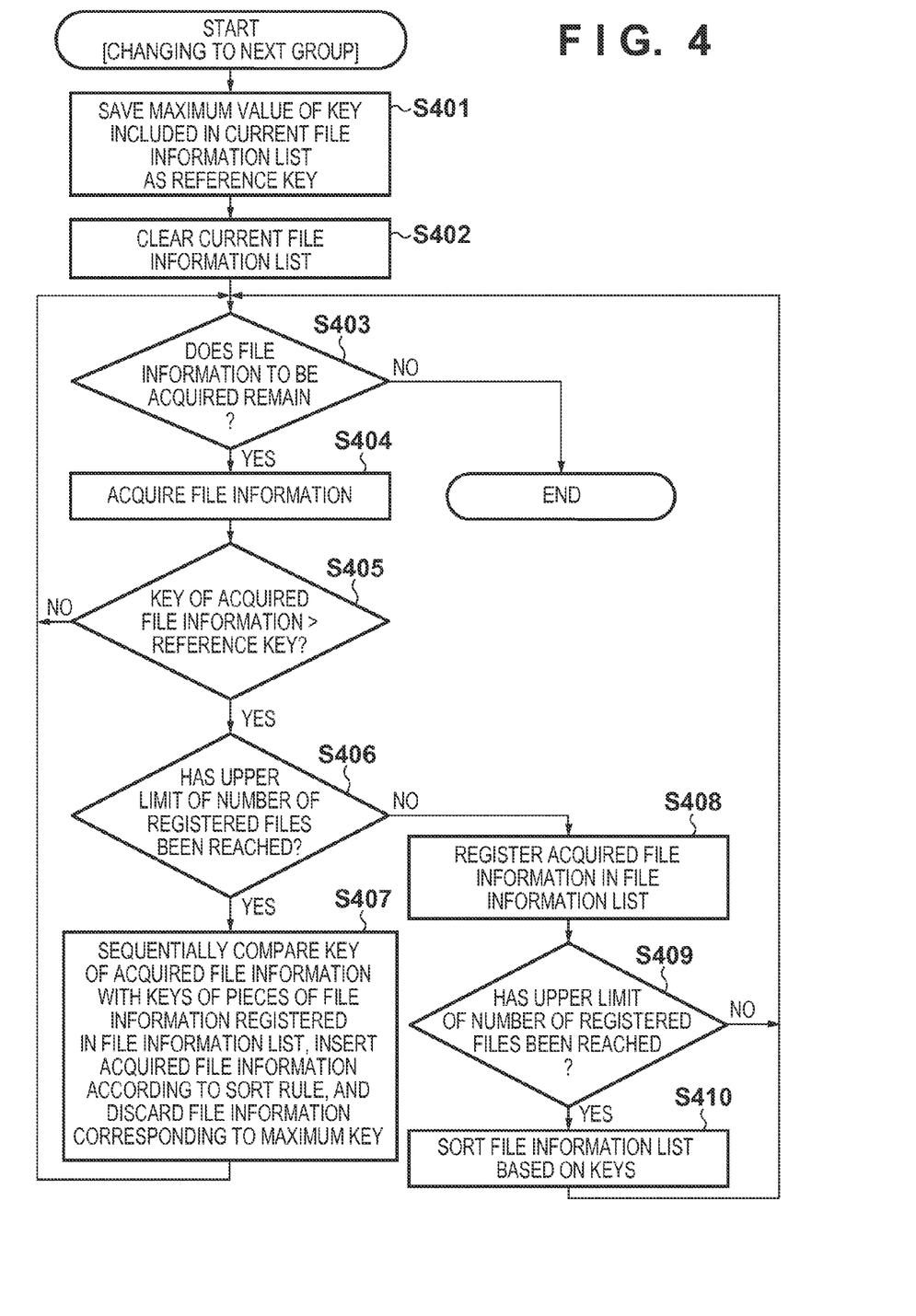
FIG. 4 is a flowchart showing the sequence of processing for changing a file information list to a next group.

If it is determined in step S303 that no image file whose file information is not acquired remains, since determination as to whether or not all image files in the storage medium belong to group "K−1" is complete, this processing ends. At this time, files included in group "K−1" are specified by the processes in steps S307, S308, and S310, and a file list of that group is ready to be generated. Hence, the CPU 101 generates a file information list based on the pieces of file information stored in the RAM 103, and outputs the generated file information list to the user. In this case, "output" includes a print output operation or display output operation to the display unit 105. When the user who checks the output result judges that desired file information is not included, he or she inputs an output instruction of a file list of another group via the operation unit 104. This instruction is issued by pressing, for example, a print start button (not shown) in case of the print output operation or an execution button (not shown) on the operation unit 104 in case of the display output operation. Upon reception of such instruction, the information processing apparatus executes processing for generating a file list corresponding to files of a group again. At this time, when the user designates a previous group, the processing shown in FIG. 3 is executed. On the other hand, when the user designates a next group, processing shown in FIG. 4 is executed.

Processing for changing a group from group "K" to group "K+1" according to a changing instruction to the next group, which is input by the user via the operation unit 104, will be described below with reference to FIG. 4. The processing shown in FIG. 4 is implemented when the CPU 101 executes a program stored in the ROM 102 using the RAM 103 as a work memory. Note that a description about the same processes as those shown in FIG. 3 will not be repeated.

The CPU 101 temporarily saves a maximum value of key values of a plurality of image files included in the current file information list 203 as a reference key (S401). A file corresponding to the maximum key value is that which corresponds to a key value closest to that of a file included in group "K+1" shown in FIG. 2. Then, the CPU 101 clears the file information list 203 currently stored in the RAM 103 (S402). Next, the CPU 101 determines whether or not an image file whose file information is not acquired of those stored in the external storage medium remains (S403). If it is determined that no image file whose file information is not acquired remains, this processing ends. No image file whose file information is not acquired remains when determination as to whether or not all image files in the storage medium belong to group "K+1" is complete.

If it is determined in step S403 that an image file whose file information is not acquired remains, file information of that image file is acquired (S404). The CPU 101 determines whether or not a key value corresponding to the acquired file information is larger than the reference key value temporarily saved in step S401 (S405). If it is determined that the key value corresponding to the acquired file information is not larger than the reference key value, the process returns to step S403. In this way, if a key value of file information of an image file of interest is not larger than the reference key value, since it is determined that the image file of interest belongs to any of groups "1" to "K" corresponding to key values smaller than group "K+1", the process returns to step S403 to search for the next image file.

On the other hand, if it is determined that the key value corresponding to the acquired file information is larger than the reference key value, the process advances to step S406. At this time, since the key value of the image file of interest is larger than the reference key value, it is determined that the image file of interest belongs to any of groups "K+1" to "L". Then, the CPU 101 determines whether or not the number of pieces of already acquired file information has reached the upper limit value N of the number of files registered per group (S406). If it is determined that the number of pieces of already acquired file information has reached the upper limit value N, a file list of the N files can already be generated. However, these N files belong to any of groups "K+1" to "L" but they do not always belong to group "K+1". Hence, processing for excluding a file which does not belong to group "K+1" of the N files from the file list is executed in step S407. The key value corresponding to the file information acquired in step S404 is sequentially compared with those corresponding to the N pieces of the already acquired file information. At this time, if the key value of the file information acquired in step S404 is larger than those of the N pieces of file information, it is determined that a file of the file information acquired in step S404 does not belong to group "K+1". On the other hand, if the key value of the file information acquired in step S404 is smaller than that of any of the N pieces of file information, it is determined that file information corresponding to a maximum key value of the N pieces of file information does not belong to group "K+1".

Hence, in step S407, as a result of the above comparison, of the file information acquired in step S404 and the N pieces of already acquired file information, file information corresponding to a maximum key value is excluded from the file list. Note that a file list including N pieces of file information is sorted according to key values of these pieces of file information in step S410 (to be described later). For this reason, in step S407, the file information acquired in step S404 is sorted according to that sort rule, and is inserted into the file information list 203 according to that sort rule, and file information corresponding to a maximum key value as a result of insertion is deleted. Note that as a result of the above comparison, if the key value of the file information acquired in step S404 is maximum, that file information is inhibited from being inserted in the file list. After such processing in step S407, the process returns to step S403.

If it is determined in step S406 that the number of pieces of already acquired file information has not reached the upper limit value N yet, the CPU 101 newly registers the file information acquired in step S404 in the file information list 203 (S408). Then, the CPU 101 determines again whether or not the number of pieces of file information registered in the file information list 203 has reached the upper limit value N (S409). If it is determined that the number of pieces of registered file information has not reached the upper limit value N yet, the process returns to step S403. On the other hand, if it is determined that the number of pieces of registered file information has reached the upper limit value N, the file information list 203 is sorted based on key values (S410), and the process then returns to step S403.

If it is determined in step S403 that no image file whose file information is not acquired remains, since determination as to whether or not all image files belong to group "K+1" is complete, this processing ends. At this time, files included in group "K+1" are specified by the processes in steps S407, S408, and S410, and a file list of that group is ready to be generated. Hence, the CPU 101 generates a file information list based on the pieces of file information stored in the RAM 103, and outputs the generated file information list to the user. In this case, "output" includes a print output operation or display output operation to the display unit 105. When the user who checks the output result judges that desired file information is not included, he or she inputs an output instruction of a file list of another group via the operation unit 104. This instruction is issued by pressing, for example, a print start button (not shown) in case of the print output operation or an execution button (not shown) on the operation unit 104 in case of the display output operation. Upon reception of such instruction, the information processing apparatus executes processing for generating a file list corresponding to files of a group again. At this time, when the user designates a next group, the processing shown in FIG. 4 is executed. On the other hand, when the user designates a previous group, the aforementioned processing shown in FIG. 3 is executed.

As shown in FIGS. 3 and 4 above, a file list is generated for each group of files. In this embodiment, only a file list of a group selected as the processing target is generated, and a file list of another group, which is not selected as the processing target, is not generated. A file list of another group (K−1, K+1), which is not selected as the processing target, is generated, as shown in FIGS. 3 and 4, when a user instruction is received. For this reason, since a group, which is not selected as the processing target and a file list of which is not generated, is specified as the processing target according to a user instruction, files included in that group can be appropriately processed.

Furthermore, as shown in steps S302 and S402, after a file list of group K as the processing target is generated, when that group is excluded from the processing target, the file list of group K is deleted from the RAM 103. For this reason, even when an area required to store a file list corresponding to all files as processing target candidates is not assured on the RAM 103, since a file list is generated every time a group is changed, all files in the storage medium can be specified as processing targets.

Note that in the aforementioned example, when the total number of image files in the external storage medium is not a multiple of N, and a group is changed to that at the rightmost or leftmost end (group 1 or L shown in FIG. 2), the number of files registered in group 1 or L may often be less than N. In this case, a file information list in which less than N files are registered may be generated, or empty file information may be inserted so that the number of registered files=N.

The case has been exemplified wherein a file list of a group which neighbors the group, the file list of which is currently generated, is generated in accordance with a group changing instruction, which is input by the user via the operation unit 104. A case will be exemplified below wherein the user can control to generate a file list of an arbitrary group by operating the operation unit 104.

For example, the user may designate a group ID of a group, a file list information of which is to be displayed, on a user interface screen displayed on the display unit 105 of the information processing apparatus. In this case, unlike in the first embodiment, the user can instruct to change a group, a file list of which is to be generated, to that which does not neighbor the group, the file list of which is currently generated. A changing instruction to a non-neighboring group is issued, for example, when the user instructs to change from group 5 to group 2. Let "K" be the current group ID, and "K+I" be a group ID designated by the user. In this case, I is a positive or negative nonzero integer. In this embodiment, by repetitively executing the processing for generating a file list of a group which neighbors the current group, as shown in FIGS. 3 and 4, according to the value of I, a file list of group "K+I" is generated. Processing for changing a group from group "K" to group "K+I" will be described below with reference to FIG. 5.

Figure 5:
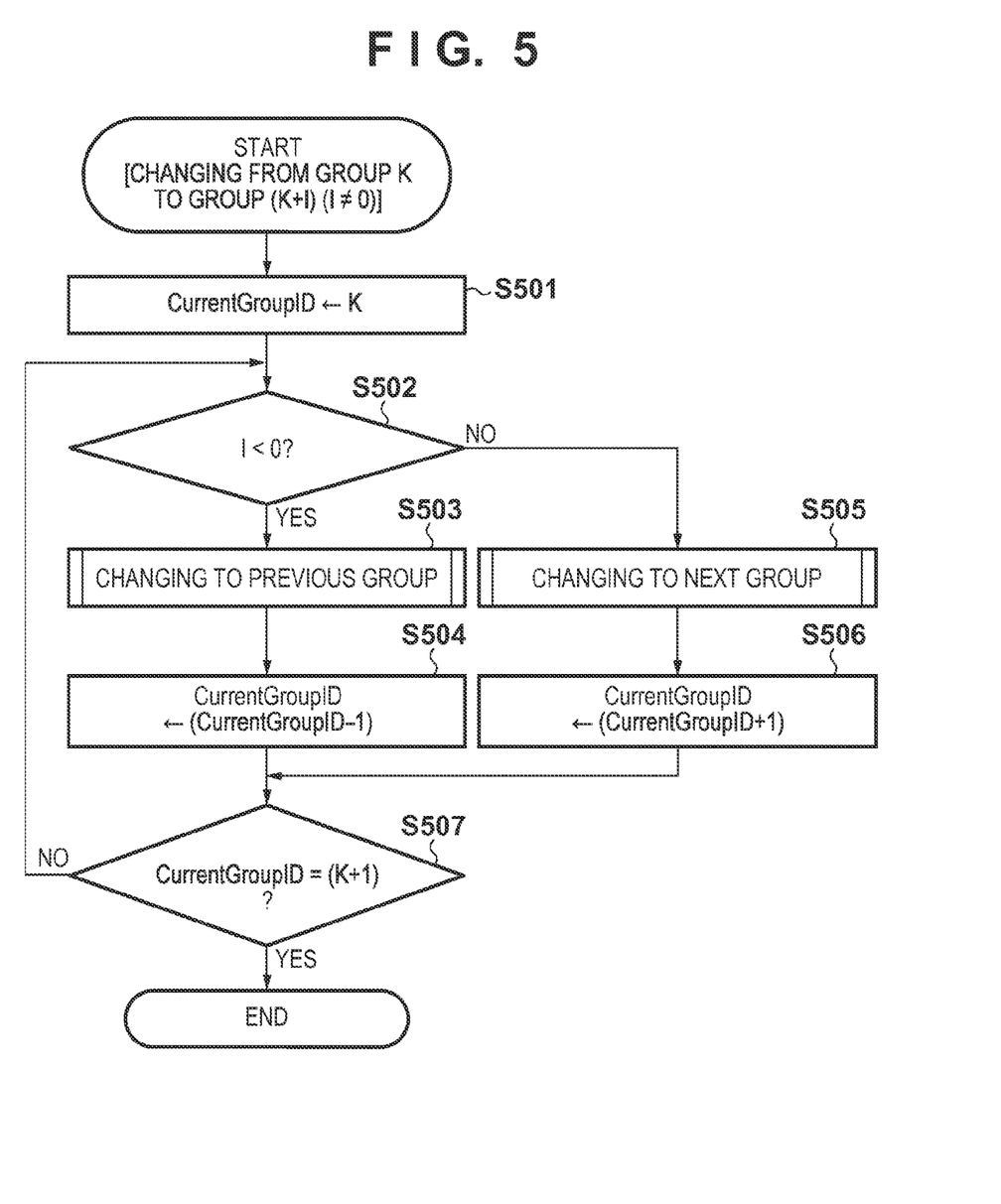
FIG. 5 is a flowchart showing the sequence of processing for changing a file information list from group K to group (K+I).

The CPU 101 sets a variable which represents a current group ID, and inputs a value of "K" in that variable (S501). Next, the CPU 101 determines based on a group ID designated by the user via the operation unit 104 whether or not I is smaller than zero (S502). In this case, if it is determined that I is smaller than zero, the CPU 101 executes the changing processing to the previous group described using FIG. 3 (S503), and adds "1" to the variable indicating the current group ID (S504). On the other hand, if it is determined that I is not smaller than zero, the CPU 101 executes the changing processing to the next group described using FIG. 4 (S505), and subtracts "1" from the variable indicating the current group ID (S506).

Next, the CPU 101 determines whether or not the variable indicating the group ID is equal to the value "K+I" (S507). In this case, if it is determined that the variable is not equal to "K+I", the process returns to step S502. On the other hand, if it is determined that the variable is equal to "K+I", this means that the processing shown in FIG. 3 or 4 has been executed I times, and files which belong to group "K+1" designated by the user are specified, thus ending this processing.

Upon completion of this processing, the CPU 101 generates a file information list based on pieces of file information stored in the RAM 103, and outputs the generated file information list to the user. In this case, "output" includes a print output operation or display output operation to the display unit 105. When the user who checks the output result judges that desired file information is not included, he or she designates another group ID on the display unit 105. Upon reception of that designation, the information processing apparatus executes the processing shown in FIG. 5 again.

In the aforementioned embodiments, a file list corresponding to some of files as processing target candidates is generated. At this time, only a file list of a group selected as the processing target is generated, and that of another group, which is not selected as the processing target, is not generated.

In this manner, even when there are a large number of files as processing target candidates, a file list corresponding to all these files need not be generated. Hence, the user can execute various processes such as display and print processes of a file selected as the processing target without waiting for generation of a file list corresponding to all these files.

Also, in this embodiment, a file list of a group, which is not selected as the processing target, is generated when a user instruction is received. For this reason, a file, which is not selected as the processing target, and a file list of which is not generated, is appropriately specified as the processing target according to the user instruction, thus appropriately processing that file.

Furthermore, in this embodiment, after a file list of files, which are selected as the processing target, is generated, when a given file is excluded from the processing target, the file list of the file is deleted from the memory of the information processing apparatus. Then, a file list is sequentially generated for each group of files. For this reason, even when an area required to store a file list corresponding to all files as processing target candidates cannot be assured on the memory of the information processing apparatus, processing can be appropriately executed for all these files.

In the aforementioned embodiments, date and time information and file names are used as keys. In this case, as the date and time information, a date and time of updating or generation of an image file, a date and time of generation of digital data in an Exif tag, a date and time of generation of original image data in the Exif tag, or the like may be used. Also, in place of a file name, a full path name of a file may be used. Furthermore, one of these pieces of information may be used as a key, or a combination of a plurality of pieces of information may be used as a key.

In the first and second embodiments, image files have been described as targets of the file information list 203. However, the file types are not particularly limited as long as data has a displayable or printable data format. For example, image data of JPEG, TIFF, PING, GIF, or the like may be used, or data described in a page description language such as PDF or HTML may be used. As the external storage medium, a USB memory or the like connected to the information processing apparatus may be used in addition to the memory card. Also, as the external storage medium, an external storage device such as a server which can communicate via a LAN or external network may be used. Furthermore, the present invention is not limited to the external storage medium of the information processing apparatus, and is applicable to a case in which a file list of files stored in the memory of the information processing apparatus is generated.

Note that in the aforementioned embodiments, after a file list of some of a plurality of files as processing target candidates is generated, a file list of other files is generated according to a user instruction. However, the present invention is not limited to the case in which a file list is generated according to the user instruction, and files, a file list of which is to be generated, may be automatically changed. For example, in FIG. 2, when a file list of group "L" is generated, that of group "L−1" is generated next. In this manner, a group for which a file list is to be generated is sequentially changed.

As an example of automatic changing processing of a group, a file list of which is to be generated, index display processing and index print processing of images are known. In such processing, a file list of a group as a display or print target is generated, and images of image files included in that group are read out from the storage medium and are expanded on the RAM 103. Then, when images are expanded while sequentially changing groups as display or print targets, images of all image files stored in the storage medium can be displayed or printed in a given pattern. At this time, after images are expanded on the RAM 103, image files of these images need not be accessed. For this reason, a file list of files, images of which have been expanded, can be deleted from the RAM 103.

In the aforementioned embodiments, files for which a file list is generated are changed for each group of files. However, the present invention is not limited to this. For example, when the number of images registered in a file list has reached the upper limit, a file may be registered one by one in the file list in accordance with a user instruction. At this time, a file already registered in the file list is deleted one by one from the file list. As a file to be deleted, when a file list of a group before the group as the processing target is to be generated, a file having a largest key value of the group as the processing target is deleted. On the other hand, when a file list of a group next to the group as the processing target is to be generated, a file having a smallest key value of the group as the processing target is deleted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161369, filed Jul. 22, 2011, which is hereby incorporated by reference herein in its entirety.

What is claimed is:

1. An information processing apparatus comprising:
an interface configured to connect with an external memory storing a plurality of files;
an internal memory; and
at least one processor configured to acquire file information of a file among the plurality of files, from the external memory via the interface, and to store the acquired file information in the internal memory,
wherein, in a case where the external memory stores the plurality of files more than a predetermined number, the at least one processor stores first file information of first files of the predetermined number, according to a predetermined consecutive order of the plurality of files, in the internal memory, and does not store second file information of second files adjacent to the first files in the predetermined consecutive order, in the internal memory,
wherein, in a case where a target of predetermined processing is changed from the first files to the second files, the at least one processor saves file information of a file among the first files and deletes the first file information from the internal memory, and
wherein, the at least one processor stores the second file information in the internal memory, by storing file information of candidate files for the second files in the internal memory based on the saved file information of the file among the first files so that a number of the candidate files does not exceed the predetermined number.

2. The apparatus according to claim 1, wherein the at least one processor stores the second file information of the second files in the internal memory, in a case where an instruction for executing the predetermined processing for the second files is input by a user.

3. The apparatus according to claim 1, wherein the at least one processor stores each of the first file information and the second file information, as each of a first file list of the first files and second file list of the second files, in the internal memory.

4. The apparatus according to claim 1, wherein, in storing the second file information, the at least one processor determines whether a target file is to be included in the candidate files, based on the saved file information of the file among the first files, and stores file information of the target file according to the determination in the internal memory.

5. The apparatus according to claim 1, wherein the file information is a file name or a file path for accessing a file as a target for the predetermined processing.

6. The apparatus according to claim 1, wherein the predetermined processing is processing for controlling a printing device to print an image corresponding to a file.

7. The apparatus according to claim 1, wherein the predetermined processing is processing for controlling a display device to display an image corresponding to a file.

8. A method executed by an information processing apparatus having a processor, an interface configured to connect with an external memory storing a plurality of files, and an internal memory, the method, comprising:
at least one processor acquiring file information of a file among the plurality of files, from the external memory via the interface, and storing the acquired file information in the internal memory,
wherein, in a case where the external memory stores the plurality of files more than a predetermined number, the at least one processor stores first file information of first files of the predetermined number, according to a predetermined consecutive order of the plurality of files, in the internal memory, and does not store second file information of second files adjacent to the first files in the predetermined consecutive order, in the internal memory,
wherein, in a case where a target of predetermined processing is changed from the first files to the second files, the at least one processor saves file information of a file among the first files and deletes the first file information from the internal memory, and
wherein, the at least one processor stores the second file information in the internal memory, by storing file information of candidate files for the second files in the internal memory based on the saved file information of the file among the first files so that a number of the candidate files does not exceed the predetermined number.

9. A non-transitory computer-readable storage medium storing a program for controlling an information processing apparatus having an interface configured to connect with an external memory storing a plurality of files, and an internal memory, to execute:
at least one processor acquiring file information of a file among the plurality of files, from the external memory via the interface, and storing the acquired file information in the internal memory,
wherein, in a case where the external memory stores the plurality of files more than a predetermined number, the at least one processor stores first file information of first files of the predetermined number, according to a predetermined consecutive order of the plurality of files, in the internal memory, and does not store second file information of second files adjacent to the first files in the predetermined consecutive order, in the internal memory, wherein, in a case where a target of predetermined processing is changed from the first files to the second files, the at least one processor saves file information of a file among the first files and deletes the first file information from the internal memory, and wherein, the at least one processor stores the second file information in the internal memory, by storing file information of candidate files for the second files in the internal memory based on the saved file information of the file among the first files so that a number of the candidate files does not exceed the predetermined number.

10. The method according to claim 8, wherein the second file list corresponding to the second files is generated in a case where an instruction for executing the predetermined processing for the second files is input by a user.

11. The method according to claim 8, wherein the first file list which corresponds to the first files and which has already been stored in the internal memory is deleted, and a second file list corresponding to the second files in the external memory is generated.

12. The method according to claim 8, wherein the first file list of files corresponding to one of a plurality of groups which are obtained by classifying the plurality of files is generated, and wherein another file list of files corresponding to another group of the plurality of groups is not generated.

13. The method according to claim 8, wherein the file information is a file name or a file path for accessing a file as a target for the predetermined processing.

14. The method according to claim 8, wherein the predetermined processing is processing for controlling a printing device to print an image corresponding to a file.

15. The method according to claim 8, wherein the predetermined processing is processing for controlling a display device to display an image corresponding to a file.

16. The apparatus according to claim 4, wherein, in a first case in which the second files are preceding files to the first files in the predetermined consecutive order, the at least one processor saves the file information of a file having a minimum number among the first files and determines that the target file having a number smaller than the minimum number is included in the candidate files, and Wherein, in a second case in which the second files are subsequent files to the first files in the predetermined consecutive order, the at least one processor saves the file information of a file having a maximum number among the first files, and determines that the target file having a number larger than the maximum number is included in the candidate files.

17. The apparatus according to claim 16, wherein in a case where the at least one processor determines that the target file is included in the candidate files and the file information of the candidate files of the predetermined number has already been stored in the internal memory, in the first case, the at least one processor deletes, from the internal memory, file information of a file having a minimum number among the candidate files and the target file, and in the second case, the at least one processor deletes, from the internal memory, file information of a file having a maximum number among the candidate files and the target file.

18. The method according to claim 12, further comprising a second generation step for generating a second file list corresponding to a second group of the plurality of groups, wherein the second group is adjacent to a first group corresponding to the first file list in the predetermined consecutive order of the plurality of files based on attribute information of the plurality of files.

19. The method according to claim 8, wherein a second file list corresponding to the second file information does not include all file information included in a first file list corresponding to the first file information.

20. The apparatus according to claim 1, further comprising a printing unit configured to print an image on a sheet, and a reading unit configured to read an original.

\* \* \* \* \*